United States Patent
Miola

(12)
(10) Patent No.: US 6,412,684 B1
(45) Date of Patent: Jul. 2, 2002

(54) PROTECTIVE LINING FOR PRESSURE EQUIPMENT WHICH CAN BE USED IN PROCESSES FOR THE SYNTHESIS OF UREA

(75) Inventor: Cesare Miola, Sannazzaro (IT)

(73) Assignee: Snamprogetti S.p.A., San Donato Milanese (IT)

( * ) Notice: Subject to any disclaimer, the term of this patent is extended or adjusted under 35 U.S.C. 154(b) by 0 days.

(21) Appl. No.: 09/169,984

(22) Filed: Oct. 13, 1998

(30) Foreign Application Priority Data

Oct. 23, 1997 (IT) .......................... MI97A2386

(51) Int. Cl.[7] .............................................. B23K 31/00
(52) U.S. Cl. .................... 228/141.1; 228/119; 228/184; 422/241
(58) Field of Search ........................ 29/455; 427/225; 422/241; 228/119, 175, 184, 141.1

(56) References Cited

U.S. PATENT DOCUMENTS

| 3,066,402 A | 12/1962 | Ingels | |
|---|---|---|---|
| 3,624,345 A | 11/1971 | Armstrong | |
| 4,224,360 A | * 9/1980 | Ohnishi et al. | ........... 219/76.12 |
| 4,600,139 A | 7/1986 | Murase | |
| 4,703,885 A | * 11/1987 | Lindgren et al. | ...... 228/262.41 |
| 5,183,198 A | * 2/1993 | Tamehiro et al. | ........... 148/529 |
| 5,362,937 A | 11/1994 | Browne et al. | |
| 5,940,951 A | * 8/1999 | Schulz et al. | ................ 228/131 |
| 6,010,669 A | * 1/2000 | Miola et al. | ................ 228/184 |
| 6,267,289 B1 | * 7/2001 | Miola | ......................... 228/119 |

FOREIGN PATENT DOCUMENTS

| EP | 0 114 893 | 8/1984 |
|---|---|---|
| EP | 0 511 084 | 10/1992 |
| WO | WO 95/00674 | 1/1995 |
| WO | WO 96/09136 | 3/1996 |

* cited by examiner

Primary Examiner—M. Alexandra Elve
Assistant Examiner—Jonathan Johnson
(74) Attorney, Agent, or Firm—Oblon, Spivak, McClelland, Maier & Neustadt, P.C.

(57) ABSTRACT

The present invention relates to a new type of lining with two layers, one of which, obtained by welding deposit, can be used for the protection of internal surfaces of chemical equipment capable of abide pressures lower than 100 MPa, in processes for the direct synthesis of urea. The present invention also relates to an original method for the preparation and installation of this lining, by the assembly of laminar elements with two layers, obtained by welding deposit on relatively thin stainless steel plates, so as to avoid significant distorsion effects on the plate itself.

16 Claims, 1 Drawing Sheet

PROTECTIVE LINING FOR PRESSURE EQUIPMENT WHICH CAN BE USED IN PROCESSES FOR THE SYNTHESIS OF UREA

The present invention relates to a protective lining for pressure equipment which can be used in processes for the synthesis of urea.

More specifically, the present invention relates to a lining for equipment suitable for tolerating pressures of up to 100 MPa, capable of providing adequate protection of the relative pressure-resistant body, normally made of carbon steel, from the aggressive action of typical process fluids in industrial plants for the production of urea, particularly with reference to equipment included in the synthesis cycle.

The construction technique of high pressure chemical equipment, whether it be reactors, separators, boilers, etc., normally comprises the preparation of a compact body capable of tolerating the operating pressures, guaranteeing maximum safety and time duration of the mechanical specifications, equipped with necessary passages for external communication and the inlet and outlet of process fluids. The most widely used material for this construction is steel, owing to its excellent combination of high mechanical properties, its relatively low cost and commercial availability.

Processes for the production of urea normally used in industry comprise at least one section which operates at high temperatures and pressures (synthesis loop), at which the process fluids, i.e. water, ammonia and especially saline solutions, become particularly aggressive. It has long been known that normal carbon steel is not capable of resisting the corrosion of these fluids at a high temperature and when in contact with them, undergoes a progressive deterioration which weakens the structure causing external losses and even explosions.

In these processes, ammonia, generally in excess, and carbon dioxide are reacted in one or more reactors, at pressures normally ranging from 10 to 30 MPa and temperatures between 150 and 240° C., obtaining an aqueous solution containing urea, the non-transformed ammonium carbamate residue and the excess ammonia used in the synthesis. This aqueous solution is purified of the ammonium carbamate contained therein by its decomposition in decomposers operating, in succession, at gradually decreasing pressures. In most of the existing processes, the first of these decomposers operates at pressures which are substantially equal to the synthesis pressure or slightly lower, and basically consists of an evaporator-decomposer (more widely known as "stripper", used hereafter) in which the aqueous solution of urea is heated with external vapor in the presence of a vapor phase in countercurrent which favours the decomposition of the carbamate and at the same time acts as entrainment fluid of the decomposition products. Stripping agents can be inert gases, or ammonia or carbon dioxide, or mixtures of inert gases with ammonia and/or carbon dioxide; the stripping can also possibly be carried out by using the excess ammonia dissolved in the mixture coming from the reactor (autostripping), consequently without introducing another external agent.

The decomposition products of ammonium carbamate ($NH_3$ and $CO_2$), together with the possible stripping agents, inert gases included, are normally condensed in a suitable condenser obtaining a liquid mixture comprising water, ammonia and ammonium carbamate, which is recycled to the synthesis reactor. In technologically more advanced plants, this condensation step is carried out at pressures substantially equal to those of the reactor or slightly lower.

As reference, among the many existing patents, U.S. Pat. Nos. 3,886,210, 4,314,077, 4,137,262 and published European patent application 504,966, can be mentioned, which describe processes for the production of urea with the above characteristics. A wide range of processes mainly used for the production of urea is provided in "Encyclopedia of Chemical Technology", 3rd Edition (1983), Vol. 23, pages 548–574, John Wiley & Sons Ed.

The most critical steps in carrying out the process are those in which the ammonium carbamate is at its highest concentration and highest temperature and consequently, in the processes mentioned above, these steps coincide with the equipment of the synthesis cycle, such as the reactor, the stripper and ammonium carbamate condenser, to mention the most important, all operating under analogous or similar conditions to those of the reactor. The problem to be solved in this equipment is that of corrosion and/or erosion particularly caused by contact with solutions of ammonium carbamate at the high temperatures and pressures necessary for the synthesis of urea.

This problem of corrosion has been confronted with various solutions in existing industrial plants and others have been proposed in literature. There are in fact numerous metals and alloys capable of withstanding for sufficiently long periods the potentially corrosive conditions arising inside a synthesis reactor of urea. Among these, lead, titanium, zirconium and several stainless steels such as, for example, AISI 316L (urea grade)steel. INOX 25/22/2 Cr/Ni/Mo steel, special austenitic-ferritic steels, etc. can be mentioned. For economic reasons however, equipment of the above type cannot be entirely constructed with these corrosion-resistant alloys or metals. Usually containers or columns are used, made of normal carbon steel, possibly multilayered, with a thickness varying from 40 to 350 mm, depending on the geometry and pressure to be tolerated (pressure-resistant body), whose surface in contact with the corrosive or erosive fluids is uniformly covered with an anticorrosive metal lining from 2 to 30 mm thick.

In particular, the reactor normally consists of a vertical container with an inlet of the reagents from below and discharge of the reaction mixture from above. The pressure-resistant body usually comprises a cylinder from 0.5 to 4 m in diameter made with a multilayer or solid wall technique, of which the two ends are closed by caps adequately welded to it. Inside the reactor, an anticorrosive lining is applied to all the walls subject to corrosion, which can consist of, for example, titanium, lead, zirconium, or preferably, stainless steels (urea grade) of the type mentioned above.

The subsequent carbamate stripper, especially if operating at the same pressure as the reactor, consists of a tube-bundle exchanger. Also in this case the pressure-resistant body is made of normal carbon steel, whereas titanium or urea-grade stainless steels are preferably used for the lining. In particular zones of the stripper there are conditions of extreme aggressivity of the fluids. This can be attributed to the high temperature, but also to the geometry of the equipment which does not allow a uniform distribution of the passivating agents, such as air, possibly combined with hydrogen peroxide, normally introduced in small quantities mixed with the process fluids.

Moreover, the injection of passivating air in the high pressure section of a urea plant can raise a risk of explosion, besides the advantage of improving the corrosion resistance of the linings most frequently used. In fact, most part of the oxygen introduced with the injected air is not consumed in the plant and is purged, mixed with the inert gas, usually from either the carbamate condenser or the top of the reactor.

This gas stream contains also ammonia and hydrogen in such an amount as to produce an explosive mixture with the oxygen at the pressure and temperature conditions of the urea process, which may have catastrophic consequences in industry.

The gases leaving the stripper are usually recondensed in a carbamate condenser which is therefore in contact with a mixture similar to that of the decomposer (except for urea) and therefore extremely corrosive. Also in this case the internal lining preferably consists of the above special urea-grade stainless steels.

In the above equipment or plant units, the anticorrosive lining is obtained by the assembly of numerous elements having adequate resistance to corrosion, so as to form, at the end, a hermetically sealed structure at the high operating pressure. For the various junctions and weldings carried out for this purpose, it is frequently necessary to resort to particular techniques depending on the geometry and nature of the parts to be joined.

In the all of the above equipment, a certain number of "weep-holes" are effected to reveal any possible losses in the anticorrosive lining.

A weep-hole normally consists of a small tube of 8–15 mm in diameter made of corrosion-resistant material, which is inserted in the pressure-resistant body until it reaches the contact point between this and the corrosion-resistant alloy or metal lining. If there is a loss in the lining, owing to the high pressure, the internal fluid which is corrosive, immediately spreads to the interstitial zone between the lining and the pressure-resistant body and, if not discovered, causes rapid corrosion of the carbon steel of which the latter is made. The presence of weep-holes enables these losses to be revealed. For this purpose all the interstitial zones beneath the anticorrosion lining must communicate with at least one weep-hole. The number of weep-holes is normally from 2 to 4 for each ferrule which means, for example, that there are usually from 30 to 60 weep-holes in a reactor.

The material used for the protective lining is normally selected from metals or metal alloys capable of tolerating contact with the process fluids without undergoing corrosion or alterations for prolonged periods. Depending on the composition and thermal level (temperature) of the process fluids, the materials selected can differ greatly from each other, also taking into consideration their cost and specific chemical properties. Materials commonly used for the lining of equipment operating at high pressure in plants for the production of urea are, for example, stainless steel, titanium, zirconium, lead. "Urea-grade" stainless steels are particularly preferred, such as AISI 316L (urea-grade) steel, INOX 25/22/2 Cr/Ni/Mo steel, special austenite-ferrite steels, etc. owing to their relatively low cost and an operating performance which is sufficient to protect equipment for several years.

Inspite of their good performance, the duration of stainless steel linings however is limited and it would be preferable to have even more resistant steels. In addition, the formation of specific zones of preferential corrosion in particular plant equipment has been observed, making it necessary to resort to repair or substitution interventions of the lining more frequently than estimated on the basis of standard corrosion resistance tests. This occurs, for example, in the high pressure stripping section.

It would therefore be desirable to further improve the performance of the lining, especially in equipment operating under critical conditions, at the same time maintaining, for obvious reasons of convenience and availability, the use of stainless steels normally adopted for its construction.

It would be also desirable to have a lined equipment, particularly a urea stripper, of such a good corrosion resistance as to avoid any injection of passivating air in the plant, in order to not incur any danger of explosion.

The Applicant has now observed that resistance to corrosion in stainless steel linings is better along weldings effected during their assembley. At the same time, it has been found however that a welding deposit situated directly on the pressure-resistant body does not allow an efficient system of weep-holes to be effected owing to the lack of interstitial zones previously mentioned, and consequently the safety of the whole equipment is reduced.

On the other hand, the formation of an extensive welding deposit on a pre-existing anticorrosion lining in certain equipment, although allowing an effective weep-hole system to be maintained, causes deformation, and in certain cases damage, of the lining itself due to the great thermal and mechanical stress on a relatively thin plate subjected to tension.

The Applicant has now found a method which allows the corrosion resistance of linings to be improved also in the most critical points of a plant for the production of urea, at the same time maintaining a high safety margin, which consists in the preparation of a lining with double-layered plates.

A first object of the present invention therefore relates to a method for the construction of a double-layered stainless steel laminar element, comprising the following operations in succession:

i) preparation of a stainless steel plate, having a thickness ranging from 2 to 30 mm, preferably from 4 to 10 mm, and a surface of more than 0.1 m$^2$, preferably between 0.5 and 5 m$^2$;

ii) consolidated fixing of this plate to a metal support with a flat surface, preferably of a size equal to or greater than the plate itself;

iii) depositing of a welding deposit onto the surface of the plate, with a thickness ranging from 0.5 to 6 mm, preferably from 1 to 4 mm;

iv) removal of the double-layered laminar element thus obtained, from the support.

A second object of the present invention relates to a method for the protection from corrosion of chemical equipment in a plant for the synthesis of urea from ammonia and carbon dioxide at high pressure and temperature, which comprises placing a lining on the surface of this equipment exposed to process fluids, said lining at least partly consisting of laminar elements with two layers welded to each other, obtained according to the method described above.

Further objects of the present invention will be made evident in the following description and examples.

In step (i) of the manufacturing method of the present invention, the plate consists of a stainless steel or alloy of stainless steels, preferably of the type called "urea grade", such as, for example, AISI 316L steel (urea grade), INOX 25/22/2 Cr/Ni/Mo steel, special austenitic-ferritic steels, and others normally known to experts in the field. The selection of the most suitable material is left to the expert in the field, on the basis of the performances desired during operation. Typical examples of these steels are those commercially available under the following names: "2 RE 69" (®, SANDVIK), "724 L" (®, AVESTA), "725 LN" (®, AVESTA), "DP 12" (®, SUMITOMO).

It is not critical, at this stage in the method of the present invention, for the plate to be preformed or shaped according to the geometry and arrangement of the double-layered element, once positioned in the relative equipment. This is in fact one of the advantages of the present invention, that the end-form of this element can be obtained with the known methods, even after its construction. For obvious reasons of greater simplicity and practicality, the plate is normally square-shaped or rectangular, with a surface extension greater than 0.1 m², preferably between 0.5 and 5 m². The scope of the present invention does not exclude however greater or smaller dimensions, when particular conditions require this. The plate more preferably has a width which is less than 1 m and up to 0.1 m, the length being selected each time according to necessity and in relation to the dimensions of the support used in carrying out step (ii).

The thickness of the plate is that normally used for the construction of a typical anticorrosive lining and is selected on the basis of criteria known to experts in the field. Thicknesses slightly less than the standard can be used owing to the contribution provided by the subsequent welding deposit to the resistance of the product. The thickness selected is normally greater than 2 mm to guarantee sufficient mechanical reliability, and less than 30 mm to facilitate the subsequent cutting and forming, as well as for obvious economic reasons. Preferred thicknesses are between 4 and 10 mm.

Plates of the above type are easily available and are produced with the usual methods of the iron and steel industry by lamination and cutting.

Step (ii) of the present manufacturing method comprises the consolidated fixing of the plate prepared according to step (i) on a suitable metal support. The term "consolidated", as used in this context, refers to the fixing of the plate onto the support which allows a surface of the former to be put in substantial contact with the surface of the latter, so that efficient heat transmission is established during the subsequent depositing of the welding material.

The metal support normally consists of a plate of an adequate thickness, usually between 20 and 200 mm, and preferably between 40 and 100 mm, having at least one relatively smooth surface so as to allow adequate mechanical support of the above plate, and an efficient heat dissipation. It consists of a material which is preferably selected from metals or alloys which can be welded to the overlying steel plate, in particular, normal carbon steel or other ferrous alloys, thus allowing easy fixing by welding points. Other metal materials however can also be used for the purpose, such as, for example, aluminum, where it is possible to effect adequate fixing with different methods from welding, for example, by means of clamps, screws, screw threads, etc.

In the particular case of fixing by welding, this is carried out by points on the edge of the plate, preferably with a distance between adjacent points of 20 to 150 mm, depending on the geometry, dimensions and thickness of the plate. In this way an assembly between plate and support is obtained which is surprisingly sufficient to ensure the absence of significant deformations in the subsequent step (iii), even for plates of various square meters.

In a particular embodiment of the present invention, the support consists of a metal plate having at least one communicating hollow space with inlets to allow the circulation of a liquid inside the plate itself This further increases the heat dissipation in the subsequent step (iii). Preferred cooling liquids are selected from oils with a low viscosity and water.

The welding deposit which is extended on the plate according to step (iii) of the present method consists of a metal or metal alloy evidently compatible with the metal or metal alloy of the plate itself, as it must adhere and amalgamate on the surface to form a continuous structure with the minimum quantity of defects possible, which is a characteristic of a proper welding between two metals.

The method for extending the welding deposit can be any of the methods known in the art, for example, welding with arc-electrodes. "T.I.G." (Tungsten Inert Gas) with wire rods, or by means of an automatic belt system. The operation can be indifferently carried out either manually or automatically (by belts), depending on the requirements of the case and dimensions and shape of the surface to be covered.

In a preferred embodiment of the present method, it is preferable to limit the thermal supply as much as possible during the extension of the welding deposit, in order to guarantee dimensional stability of the underlying metal plate and not to produce metal pick-ups between the two parts. This is achieved, for example, by limiting the power emitted by the welder so that no point of the surface of the plate opposite the welding welding surface (that leaning on the support) exceeds a temperature of 450° C. Thermal flows ranging from 8000 to 16000 J/cm² are advantageously used.

The metal or metal alloy used for the welding deposit is preferably a stainless steel of the type which is resistant to corrosion of the process fluids involved in the high pressure cycle of the synthesis of urea, particularly aqueous-ammonia solutions of carbamate and/or urea such as those present in the reactor at the bottom of the stripper or in the chamber of the carbamate condenser. These steels are known in the art and are commercially available. They contain, in addition to iron, other metals compatible with this and resistant to oxidation in an acid environment, such as, for example, Ni, V, Cr, W, Mo, etc. in sufficient quantities and combinations to make the resulting alloy corrosion resistant under the normal operating conditions. Typical examples of these steels are those previously mentioned for forming the stainless steel plate on which the welding deposit of the present invention is effected. Particularly preferred are urea grade stainless steels for welding, which have a particularly low content of ferrite and other elements different from those listed above, and can comprise appropriate additives, such as flows and fluxes, suitable for favouring melting and adhesion on the surface to be welded. Typical examples of these steels are those available on the market under the tradenames "P6" (®, AVESTA), "Batox F(U) M" (®, SECHERON), "Thermanit 19/15 H" (®, THYSSEN), "NC 316 MF" (®, KOBE STEEL), "16KCR" (®, ESAB), "CITOXID B 316LM" (®, SIDEROTERMICA), "No. 4051" (®, KOBE STEEL), "Siderfil 316 LM" (®, SIDEROTERMICA), "20-16-3 L Mn" (®, SANDVIK) with flow "12 b 316 LFT 2" (®, SOUDOMETAL), "21.17.E" (®, THYSSEN) with flow "Rekord 13 BLFT" (®, SOUDOMETAL), "25-22-2 L Mn" (®, SANDVIK) with flow "12 b 316 LFT 2" (®, SOUDOMETAL), "25-22-2 L Mn" (®, SANDVIK) with flow "31 S (®, SANDVIK), "FOX EASN 25 M" (®, VEW), "Thermanit 25/22 H" (®, THYSSEN), "Soudinox LF" (®, SOUDOMETAL), "NC 310 MF" (®, KOBE STEEL), "FILARC BM 310 Mo L" (®, ESAB), "Grinox 67" (®, GRIESHEIM), "TGS 310 MF" (®, KOBE STEEL), "FOX EASN 25 MIG" (®, VEW), "Grinox T67" (®, GRIESHEIM), "25-22-2 L Mn" (®, SANDVIK) with flow "37 S (electroslag)" (®, SANDVIK), "25-22 H" (®, THYSSEN) with flow "EST 122 (electroslag)" (®, SOUDOMETAL). The selection of the most suitable welding material is left to experts in the field, depending on the composition of the plate on which the welding is carried out and the final characteristics desired.

The thickness of the stainless steel plate as per step (i) is preferably uniform, even though this requisite is not essential for the purposes of the present invention. It is also preferable for the plate to be flat as this simplifies the dispersion of the heat produced by the welding deposit in step (iii) and also facilitates the fixing of the plate to the support according to step (ii). The thickness of the welding deposit deposited on the plate according to step (iii) of the present method is preferably maintained at a value which is more or less equal on the whole surface of the deposit, to guarantee uniform performance of the end-product thus obtained. In quantitative terms this thickness can have at the most a deviation from the average value of ±20%, preferably ±10%.

In the subsequent step (iv), the double-layered laminar element obtained according to the procedure of step (iii) is removed from the support onto which it was fixed using normal operations. If the fixing was effected by welding, the removal must be carried out with due precautions to avoid distorsion of the plate.

In this way, a double-layered laminar element is obtained which is essentially without deformations, and which can be used for the production of anticorrosive linings of equipment used in plants for the production of urea, comprising a first layer consisting of a stainless steel metal plate having a thickness ranging from 2 to 30 mm, preferably between 2 and 15 mm, and a surface extension of more than 0.1 m$^2$, preferably between 0.5 and 5 m$^2$, characterized in that the second layer has an almost uniform thickness, ranging from 0.5 to 6 mm, preferably between 1 and 4 mm, is uniformly welded to the first layer and consists of a stainless steel of the type called "urea grade" obtained by welding deposit.

This second layer preferably consists of a welding deposit of a stainless steel selected from AISI 316L (urea grade) steels, INOX 25/22/2 Cr/Ni/Mo steels, special austenite-ferrite steels; it is more preferably obtained by the deposit of one of the particular welding materials listed above.

The present invention also relates to a method for the protection from corrosion by process fluids of equipment or elements resistant to high pressures of a plant for the production of urea, particularly in the synthesis section, comprising the production of a hermetically sealed lining of at least a part of the surface of this equipment in contact with process fluids, by means of one or more of the above double-layered laminar elements of the present invention, suitably shaped and welded to each other.

The selection of the most suitable construction technology among the many known methods for the production of the protective lining of the present invention is left to experts in the field, comprising cutting and welding methods, as well as those for obtaining weep-holes in the most appropriate points, the annealing of the weldings on the pressure-resistant body, the application of welding deposits below the welding lines, and also additional protection in the case of accidental losses, the formation of communication points or slots between the various interstitial zones beneath the lining and among these weep-holes, the shaping methods of the laminar elements, such as calendering or moulding, and all the other known techniques which can be used for the purpose.

The above method of the present invention allows the corrosion resistance of equipment involved in the synthesis process of urea to be improved, maintaining all the elements necessary for guaranteeing the safety of the plant and also enables accidental losses to be revealed. In fact, this lining is produced with the known methods used for traditional linings, i.e. by placing the double-layered elements onto the underlying pressure-resistant body without extensive welding, but only welding the edges to each other and to the underlying pressure-resistant body, thus forming interstices between lining and pressure-resistant body which communicate with each other and with a system of weep-holes to reveal any possible losses.

On the contrary, an extensive welding deposit directly on the pressure-resistant body would not make it possible to maintain an efficient safety system based on weep-holes, as there would not be interstitial spaces suitable as outlets for the corrosive fluids in the case of losses of the lining. In these cases the corrosive process fluid would not be revealed and would remain in contact with the carbon steel of the pressure-resistant body causing its corrosion and jeopardizing the structure.

According to a particular aspect of the present invention, not all the surface of the equipment is lined with the above double-layered laminar elements having improved resistance to corrosion, but optionally, only the part attributed as being the most exposed to corrosion. For example, in the case of stripping equipment, a lining can be produced with double-layered elements in the lower section where the process temperature is higher, providing a traditional type lining, evidently less expensive, in the upper section which is less exposed to corrosive attack.

As previously specified, the method of the present invention can be particularly applied to the high or medium pressure section of a synthesis plant of urea. This substantially refers to synthesis reactors of urea, equipment for the decomposition of non-transformed carbamate (particularly strippers), and containers for the condensation of $NH_3$ and $CO_2$ with the formation of carbamate solutions.

This equipment operates at pressures normally ranging from 10 to 50 MPa and temperatures ranging from 70 to 300° C., in the presence of mixtures containing water, ammonia, carbon dioxide and ammonium carbamate which is the condensation product of these compounds according to the reaction:

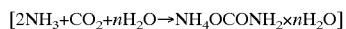

Figure 1:
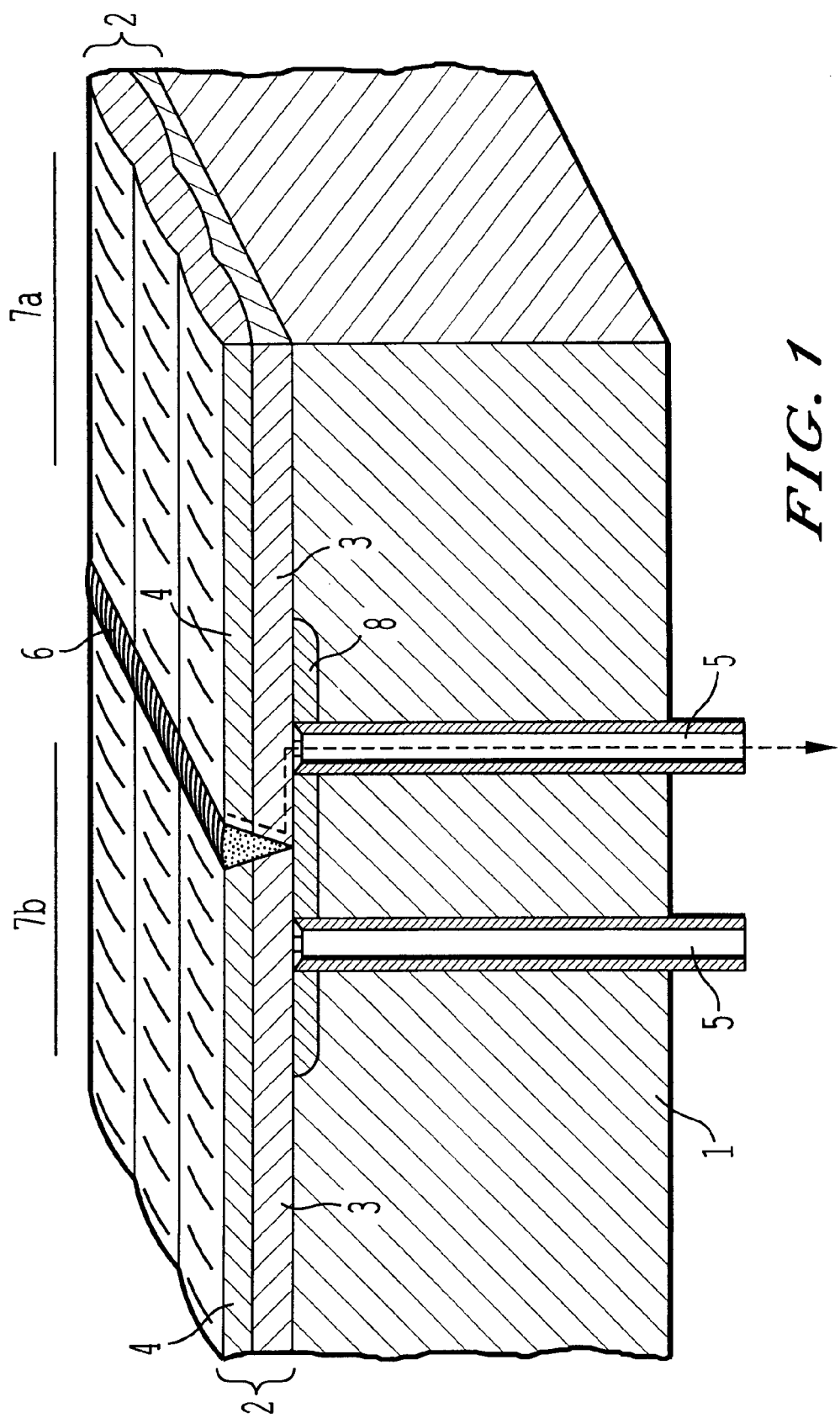
FIG. 1 schematically represents a perspective view of the longitudinal section of the wall of a high pressure stripper in a plant for synthesis of urea.

The operating conditions are preferably a pressure of 12–25 MPa and a temperature of 120 to 240° C.

In normal industrial plants for the production of urea, to which the present invention particularly relates, the above equipment included in the high or medium pressure section normally contains volumes ranging from 2000 to 400000 liters.

The production of the anticorrosive lining of the present invention comprises the positioning, on the surface of the pressure-resistant body, of the above double-layered laminar elements, suitably cut and shaped to adapt themselves to the curvature of the surface to be lined. As they can become easily deformed however, suitable curvature can be obtained with normal instruments available to experts in the field.

The double-layered elements are arranged side by side to facilitate their subsequent welding. Slots, supports, connecting elements and other interventions or products are arranged, especially along the edges to be welded, according to common practice known to experts in the field.

The welding of the double-layered laminar elements arranged as described above, is usually carried out with one of the methods previously listed with reference to the welding deposit procedure. The production of the weep-hole system is also left to the experts in the field.

The improved anticorrosive lining of the present invention is also suitable for the functional restoration of pre-existing equipment whose original lining requires substitution or repair owing to the presence of significant corrosion zones which jeopardize its functionality and safety. In particular, it is possible in this way to completely re-establish the original functionality of the equipment and guarantee, owing to the improved performance of the new lining, greater duration and operating safety than the original.

The various aspects of the present invention are further illustrated by referring to the drawing of FIG. 1 enclosed, which schematically represents a perspective view of the longitudinal section of the wall of a high pressure stripper in a plant for the synthesis of urea, and also the example described below, without limiting or restricting the overall scope of the present invention in any way.

FIG. 1 essentially illustrates the section of the pressure-resistant body 1, made of stainless steel on whose surface the lining 2 is placed, which consists of a lower layer 3, in direct contact with the pressure-resistant body and made up of a traditional stainless steel plate, and an upper layer 4 welded to the previous layer and consisting of a welding deposit according to the present invention. It is also possible to observe the weep-holes 5 below the welding 6 between two double-layered laminar elements 7a and 7b which locally form the above lining. The weep-holes are situated below the lining 2, near the welding line 6, below which is a welding deposit 8, also in stainless steel, which has the purpose of stably and homogeneously anchoring the welding to the pressure-resistant body to prevent the latter from being damaged by possible losses (normally due to accidental defects in the welding itself). FIG. 1 also schematically represents, with the dashed line, the flow of the process fluid deriving from a possible loss due to a welding defect, which runs above the deposit 8 until it reaches the nearest weep-hole 5.

The above description of the present invention in general lines and details, is followed by a practical example for its application.

EXAMPLE

The lower head of a stripper used in the high pressure synthesis cycle of a plant for the production of urea was equipped with an anticorrosive lining according to the present invention, whereas the remaining part of the equipment was equipped with a traditional lining made of 25/22/2 Cr/Ni/Mo steel.

The head, consisting of a cylindrical stainless steel body having a diameter of 840 mm and a length of 2000 mm and equipped with a manhole of 600 mm in diameter, was completely lined with the new double-layered lining in accordance with the following procedure.

An adequate number of rectangular steel plates of 25/22/2 Cr/Ni/Mo having a thickness of 6 mm and dimensions of about 600 mm×1200 mm, were prepared. Each plate was fixed onto a support consisting of a carbon steel plate 80 mm thick and equipped with a hollow space for the continuous circulation of cooling water, by means of welding points on the edge at a distance of about 100 mm from each other.

A welding deposit having a thickness of about 3 mm was deposited on the exposed face of the plate thus fixed, by means of a plunged arc and an automatic procedure, using a "25/22/2 L Mn" (®, SANDVIK) tape 30 mm wide and 0.5 mm thick with a "Rekord 13 BLFT" (®, SOUDOMETAL) flow, with a shift of 180 mm/minute and a thermal flow of 38,000 J/cm (12,670 J/cm$^2$). Adjacent strips were deposited having a width of about 30 mm until the whole plate was covered. Water was circulated in the hollow space of the support during the entire procedure so that the temperature of the underlying face of the plate was maintained below 350° C.

With reference to the section represented in FIG. 1, the pressure-resistant body 2 of the head was prepared for the lining with the usual method, by making slots having a width of about 60 mm and a depth of about 4 mm in correspondence with the estimated welding lines of the lining, and then filling these with the welding deposit 8 made of 25/22/2 Cr/Ni/Mo steel. Weep-holes 5 were made through the welding deposit and pressure-resistant body in an adequate quantity and position to guarantee the revealing of any possible losses at any point in the equipment. Each weep-hole is lined with 25/22/2 Cr/Ni/Mo steel and the edge is hermetically sealed with the above welding deposit 8. The double-layered laminar elements obtained as described above were subjected to calendering to provide a curvature in conformance with the geometry of the head, and were then positioned on the pressure-resistant body and fixed with welding lines 6 to each other and to the underlying deposit 8, thus forming the desired lining (7a and 7b). The welding was carried out with the T.I.G. method with "Thermanit 25/22 H" (®, THYSSEN) rods.

At the end of the operation, the stripper was subjected to the usual verifications to ensure satisfactory functioning. In particular, the following tests were carried out:

Welding control with penetrating liquids according to regulation "ASME VIII, div. 1 appendix 8", Gas seal test according to regulation "ASME V, article 10", carried out with helium, Pressure seal test, carried out by bringing the internal pressure of the reactor to the value specified by the project regulations (320 bars).

All of the above tests gave satisfactory results.

The stripper thus obtained was subsequently started up at plant regime and was left functioning for at least two years, except for interruption periods for ordinary maintenance, without there being, on careful examination, any specific losses or significant thinning out due to corrosion of the lining. Analogous equipment, operating under the same conditions and equipped with a traditional lining showed, after the same period, significant deterioration zones and thinning out of the lining in the lower head.

A further test made with no injection of passivating air also showed very low or absence of corrosion of the stripper lined according to the present invention.

What is claimed is:

1. A method for the production of a double-layered stainless steel laminar element, comprising the following operations in succession:

i) preparation of a stainless steel plate, having a thickness ranging from 2 to 30 mm, and a surface area of more than 0.1 m$^2$;

ii) consolidated fixing of the plate to a metal support with a flat surface;

iii) depositing of a welding deposit onto the surface of the plate, with a thickness ranging from 0.5 to 6 mm;

iv) removal of the double-layered laminar element thus obtained, from the support.

2. The method according to claim 1, wherein the plate consists of a stainless steel selected from the group consisting of AISI 316L urea grade steel, INOX 25/22/2 Cr/Ni/Mo steel and austenitic-ferritic steel; and wherein said plate has a thickness ranging from 4 to 10 mm, and a surface area ranging from 0.5 to 5 m².

3. The method according to claim 1, wherein, in step (ii) the support is made of carbon steel, has an extension equal to or greater than the stainless steel plate and a thickness ranging from 40 to 100 mm.

4. The method according to claim 1, wherein the support in step (ii) is equipped with a hollow space for the circulation of a cooling fluid.

5. The method according to claim 1, wherein the fixing of the plate to the support in step (ii) is carried out by welding with points at a distance of 4 to 15 cm from each other.

6. The method according to claim 1, wherein the welding deposit in step (iii) has an almost uniform thickness ranging from 1 to 4 mm.

7. The method according to claim 1, wherein the welding deposit is deposited by limiting the thermal flow supplied by the welder to a value ranging from 8000 to 16000 J/cm².

8. The method according to claim 1, wherein in step (iii), cooling water is circulated in the hollow space of the support so that no point of the surface of the plate opposite to that of deposit exceeds a temperature of 450° C.

9. The method according to claim 1, wherein said stainless steel plate has a surface area of between 0.5 and 5 m².

10. The method according to claim 1, wherein said double-layered stainless steel laminar element is essentially without deformations, and comprises:

a first layer consisting of a stainless steel metal plate having a thickness ranging from 2 to 30 mm and a surface extension of more than 0.1 m²; and a second layer having a thickness ranging from 0.5 to 6 mm uniformly welded onto the first layer, and consisting of a metal material obtained by the welding deposit of a metal or metal alloy selected from the group consisting of AISI 316L urea grade steel, INOX 25/22/2 Cr/Ni/Mo steel and austenite-ferrite steel.

11. The method according to claim 10, wherein the second layer is obtained by the welding deposit of a steel selected from the group consisting of AISI 316L steel, INOX 25/22/2 Cr/Ni/Mo steel, and austenitic-ferritic steel.

12. A method for the functional restoration of chemical equipment in a plant for the production of urea by reaction of ammonia and carbon dioxide at high temperatures and pressures, in which at least one extensive zone has been subjected to corrosion, characterized in that the functioning of this equipment is re-established by repair comprising the production of a hermetically sealed lining on the zone subject to corrosion by one or more double-layered elements according to claim 10, suitably shaped and welded to each other.

13. The method according to claim 10, further comprising using said double-layered stainless steel laminar element for the production of anti-corrosive linings of equipment used in plants for the production of urea.

14. A method for the protection from the corrosion of process fluids of equipment or elements resistant to high pressures of a plant for the production of urea, comprising:

producing a hermetically sealed lining of at least a part of the surface of said equipment in contact with the process fluids, by one or more double-layered laminar elements according to claim 10, suitably shaped and welded to each other.

15. The method according to claim 14, wherein said equipment is a reactor or a stripper operating at pressures ranging from 10 to 50 MPa and temperatures ranging from 70 to 300° C.

16. The method according to claim 14, wherein the equipment or elements are included in a synthesis cycle for urea.

* * * * *

UNITED STATES PATENT AND TRADEMARK OFFICE
CERTIFICATE OF CORRECTION

PATENT NO.   : 6,412,684 B1
DATED         : July 2, 2002
INVENTOR(S)  : Cesare Miola It is certified that error appears in the above-identified patent and that said Letters Patent is hereby corrected as shown below:

Column 11,
Line 35, "AISI 316L urea grade steel," should read -- AISI 316L steel, --

Column 12,
Line 3, "AISI 316L steel," should read -- AISI 316L urea grade steel, --

Signed and Sealed this

Eighteenth Day of February, 2003

JAMES E. ROGAN
*Director of the United States Patent and Trademark Office*